United States Patent
Manchester et al.

(10) Patent No.: US 6,724,728 B1
(45) Date of Patent: Apr. 20, 2004

(54) METHOD AND SYSTEM FOR DISTRIBUTED PROCESSING OF TRAFFIC IN A TELECOMMUNICATIONS NODE

(75) Inventors: Earl B. Manchester, Rohnert Park, CA (US); Barry W. Field, Santa Rosa, CA (US); Robert D. Howson, Jr., Santa Rosa, CA (US); Soren B. Pedersen, Petaluma, CA (US); Tom Potter, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/419,204

(22) Filed: Oct. 15, 1999

(51) Int. Cl.⁷ .......................... H04L 1/00; H04L 12/26; H04J 1/16; H04J 3/14
(52) U.S. Cl. .................. 370/236.2; 370/249; 370/236.1
(58) Field of Search .................. 370/229, 230–231, 370/235, 236, 236.1, 236.2, 249, 395.1

(56) References Cited

U.S. PATENT DOCUMENTS

| | | | |
|---|---|---|---|
| 5,436,893 A | * 7/1995 | Barnett | 370/392 |
| 5,570,362 A | 10/1996 | Nishimura | 370/60.1 |
| 5,577,039 A | 11/1996 | Won et al. | 370/60.1 |
| 5,659,540 A | * 8/1997 | Chen et al. | 370/249 |
| 5,734,653 A | 3/1998 | Hiraiwa et al. | 370/395 |
| 5,848,067 A | 12/1998 | Osawa et al. | 370/394 |
| 5,864,555 A | * 1/1999 | Mathur et al. | 370/236.2 |
| 5,920,558 A | * 7/1999 | Saito et al. | 370/359 |
| 5,943,339 A | 8/1999 | Mauger | 370/397 |
| 6,243,382 B1 | 6/2001 | O'Neill et al. | 370/395 |
| 6,404,782 B1 | 6/2002 | Berenbaum et al. | 370/522 |
| 6,442,167 B1 | 8/2002 | Aramaki et al. | 370/395.43 |

OTHER PUBLICATIONS

ITU–T Recommendation I.363, "B–ISDN ATM Adaptation Layer (AAL) Specification," Mar. 1993, 100 pages.
Bellcore GR–253–CORE, "Synchronous Optical Network (SONET) Transport Systems: Common Generic Criteria," Issue 2, Dec. 1995, (with rev. Jan. 1999), 788 pages.
ATM Forum, "Circuit Emulation Service Interoerability Specification," Version 2.0, Jan. 1997, AF–V-TOA–0078.000, 101 pages.
ATM Forum, "Specifications of (DBCES) Dynamic Bandwidth Utilization—64Kbps Time Slot Trunking over ATM—Using CES," Jul. 1997, AF–VTOA–0085.000, 32 pages.
Bellcore GR–2837, "ATM Virtual Path Ring Functionality in SONET—Generic Criteria," Feb. 1998, 154 pages.
Power PC, POWERQUICC™, MPC860 User's Manual Motorola, © 1996, 1,143 pages, Jul. 1998.
International Telecommunication Union, Series I: Integrated Servicdes Digital Network, "B–ISDN operation and maintenance principles and functions," Feb. 1999, 116 pages.
"About ATM" www.atmforum.com/atmforum/library/notes1, 2, 3, 4 and 5 printed Aug. 30, 1999, 5 pages.

(List continued on next page.)

*Primary Examiner*—Wellington Chin
*Assistant Examiner*—Raj Jain
(74) *Attorney, Agent, or Firm*—Baker Botts L.L.P.

(57) ABSTRACT

A method and system for distributed processing of traffic in a telecommunications node includes receiving a traffic stream at a line card of the telecommunications node. The traffic stream includes a plurality of discrete cells. The cells are forwarded from the line card to a centralized switch of the telecommunications node. The centralized switch identifies cells that are of a particular type. Cells of the particular type are returned from the centralized switch to the line card. The returned cells are processed at the line card.

31 Claims, 4 Drawing Sheets

OTHER PUBLICATIONS

U.S. patent application Ser. No. 09/390,420, entitled "Method and System for Transmitting Traffic Having Disparate Rate Components," filed Sep. 3, 1999, 30 pages. (0368).

U.S. patent application Ser. No. 09/452,753 entitled "Method and System for Transporting Synchronous and Asynchronous Traffic on a Synchronous Bus of a Telecommunications Node," filed Dec. 1, 1999, 124 pages. (0363).

U.S. patent application Ser. No. 09/452,759, entitled "Fused Switch Core and Method for a Telecommunications Node," filed Dec. 1, 1999, 114 pages. (0364).

U.S. patent application Ser. No. 09/452,746, entitled "Method and System for Transporting Synchronous and Asynchronous Traffic on a Bus of a Telecommunications Node," filed Dec. 1, 1999, 122 pages. (0365).

U.S. patent application Ser. No. 09/452,829, entitled "Rate Adjustable Backplane and Method for a Telecommunications Node," filed Dec. 1, 1999, 119 pages. (0366).

U.S. patent application Ser. No. 09/452,830, entitled "Asynchronous Transfer Mode (ATM) Switch and Method for a Telecommunications Node," filed Dec. 1, 1999, 119 pages. (0367).

U.S. patent application Ser. No. 09/452,751, entitled "Synchronous Switch and Method for a Telecommunications Node," filed Dec. 1, 1999, 119 pages. (0372).

U.S. patent application Ser. No. 09/452,828, entitled "Time Slot Interchanger (TSI) and Method for a Telecommunications Node," filed Dec. 1, 1999, 117 pages. (0373).

U.S. patent application Ser. No. 09/607,771, entitled "Method and System for Protection Switching in a Telecommunications Network," filed Jun. 30, 2000, 32 pages. (0388).

U.S. patent application Ser. No. 09/628,535, entitled "Method and System for Reprogramming Instructions for a Switch," filed Jul. 31, 2000, 35 pages. (0370).

U.S. patent application Ser. No. 09/657,068, entitled "Method and System for Processing Traffic in an Access Network," filed Sep. 7, 2000, 41 pages. (0362).

"Asynchronous Transfer Mode (ATM) Switching," printed from www.cisco.com on Aug. 27, 2002, 19 pages.

* cited by examiner

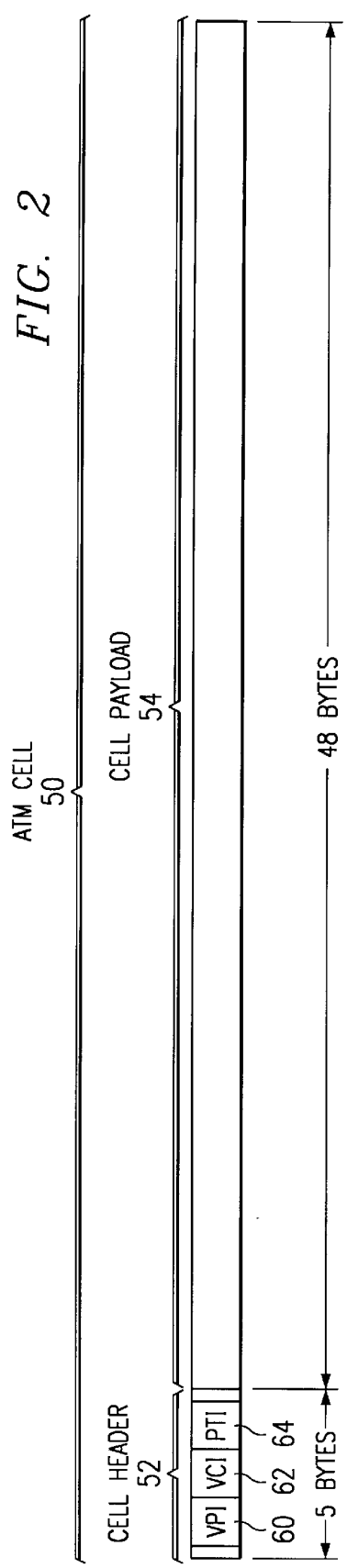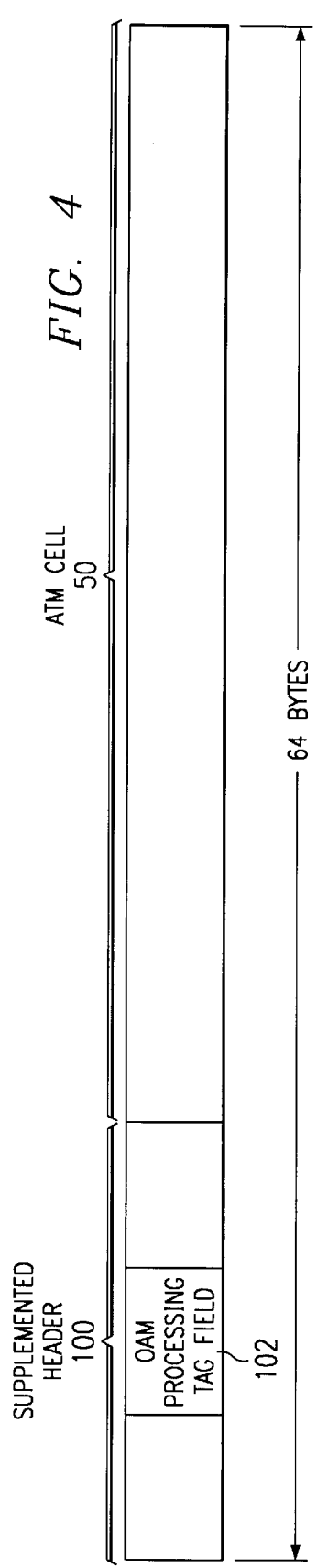

METHOD AND SYSTEM FOR DISTRIBUTED PROCESSING OF TRAFFIC IN A TELECOMMUNICATIONS NODE

BACKGROUND OF THE INVENTION

The Internet has dramatically increased the potential for data, voice and video services for customers. Existing circuit-switched telephony systems, however, do not provide the foundation to support the growing need for bandwidth and new services required by both residential and business consumers. As a result, integrated access devices have been introduced to support Internet and related technologies as well as standard telephony service.

Integrated access devices often employ asynchronous transfer mode (ATM) functionality to multiplex data, voice and video traffic together onto a single network. ATM is a connection-oriented packet-switching technology in which information is organized into small, fixed length cells. ATM carries data asynchronously, automatically assigning data cells to available time slots on demand to provide maximum throughput. Compared with other network technologies, ATM provides large increases in maximum support bandwidth, support for multiple types of traffic such as data, video, and voice transmissions on shared communication lines, and virtual networking capabilities, which increase bandwidth utilization and ease network administration.

ATM traffic is routed through a telecommunications network at high speeds using a switching tag included in the ATM cells. The switching tag defines a virtual path (VP) and a virtual channel (VC) in the network through which the cells are routed. The use of virtual path and channel connections allows physical bandwidth in the network to be subdivided and separately utilized.

ATM manages virtual connections through an ATM management layer (M-Plane) that consists of a stream of operation, administration and management (OAM) cells associated with each virtual connection between network elements. The OAM cells may be segment OAM cells communicated between adjacent elements in a virtual connection or end-to-end OAM cells transmitted between source and termination elements in the connection.

As the number of virtual connections supported by a network element rises, the load on the central processor to recognize and provide supplemental processing for OAM cells also rises. The increased load can become cumbersome to manage and can interfere with normal traffic flow. Processor upgrades to handle OAM processing can be prohibitively expensive for many low-cost applications in which access devices are utilized.

One solution to reduce the overall processing load on a central processor is to off-load OAM processing to line cards within the network element. In this case, functionality is added to the line cards to perform header recognition and look-up at line-rates on the incoming ATM cell streams and for processing the OAM cells. While this provides a more scalable architecture, the added hardware complexity and costs are prohibitive for many low rate cards and applications.

SUMMARY OF THE INVENTION

The present invention provides an improved method and system for processing asynchronous transfer mode (ATM) operation, administration, and management (OAM) traffic in a telecommunications node. In particular, processing of OAM and other suitable traffic is distributed in the telecommunications node between line cards and a centralized switch processor to provide a low-cost scalable architecture for the node.

In accordance with one embodiment of the present invention, a method for distributed processing of traffic in a telecommunications node includes receiving a traffic stream at a line card of the telecommunications node. The traffic stream includes a plurality of discrete cells. The cells are forwarded from the line card to a centralized switch of the telecommunications node. The centralized switch identifies cells that are of a particular type. Cells of the particular type are returned from the centralized switch to the line card. The returned cells are processed at the line card.

More specifically, in accordance with the particular embodiment of present invention, the discrete cells are asynchronous transfer mode (ATM) cells. In this embodiment, the cells of the particular type are operation, administration, and management (OAM) cells having a loop-back indicator. Thus, the OAM cells are identified at the centralized switch and processed by a line card.

Technical advantages of the present invention include providing an improved method and system for processing management and other suitable traffic that is in need of specialized processing in a telecommunications node. In particular, processing of the traffic is distributed between a centralized switch processor and a line card or other suitable element in the telecommunications node. This alleviates the overall processing load on the centralized switch processor and allows other value-added processing to be performed by the centralized switch processor on a traffic stream.

Another technical advantage of the present invention includes providing an improved method and system for transmitting ATM traffic in a telecommunications system. In particular, ATM OAM cells are recognized by a centralized ATM switch and looped back to the receiving line card for processing. As a result, processing of the OAM cells is off-loaded to the line cards while header recognition and look-up on an incoming ATM stream is conventionally performed by the centralized ATM switch in connection with its normal switching activities. Thus, cost and board space on line cards with OAM processing functionality are reduced. In addition, the scalable management layer (M-plane) architecture insures that ATM switching capacity of the node is limited only by switch bandwidth, not processing power.

Still another technical advantage of the present invention includes providing a more scalable architecture for a telecommunications access device. In particular, processing of specified types of traffic is distributed between elements in a node to take advantage of parallel processing power of multiple processors spread across multiple elements. As a result, system cost is more directly proportional to functionality which allows low-cost solutions for low-rate and other limited applications.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 2 is a block diagram illustrating header and payload portions of an asynchronous transfer mode (ATM) cell for transmission in the telecommunications system of FIG. 1;

FIG. 4 is a block diagram illustrating a supplemental header for the ATM cell of FIG. 2 in accordance with one embodiment of the present invention.

DETAILED DESCRIPTION OF THE INVENTION

Figure 1:
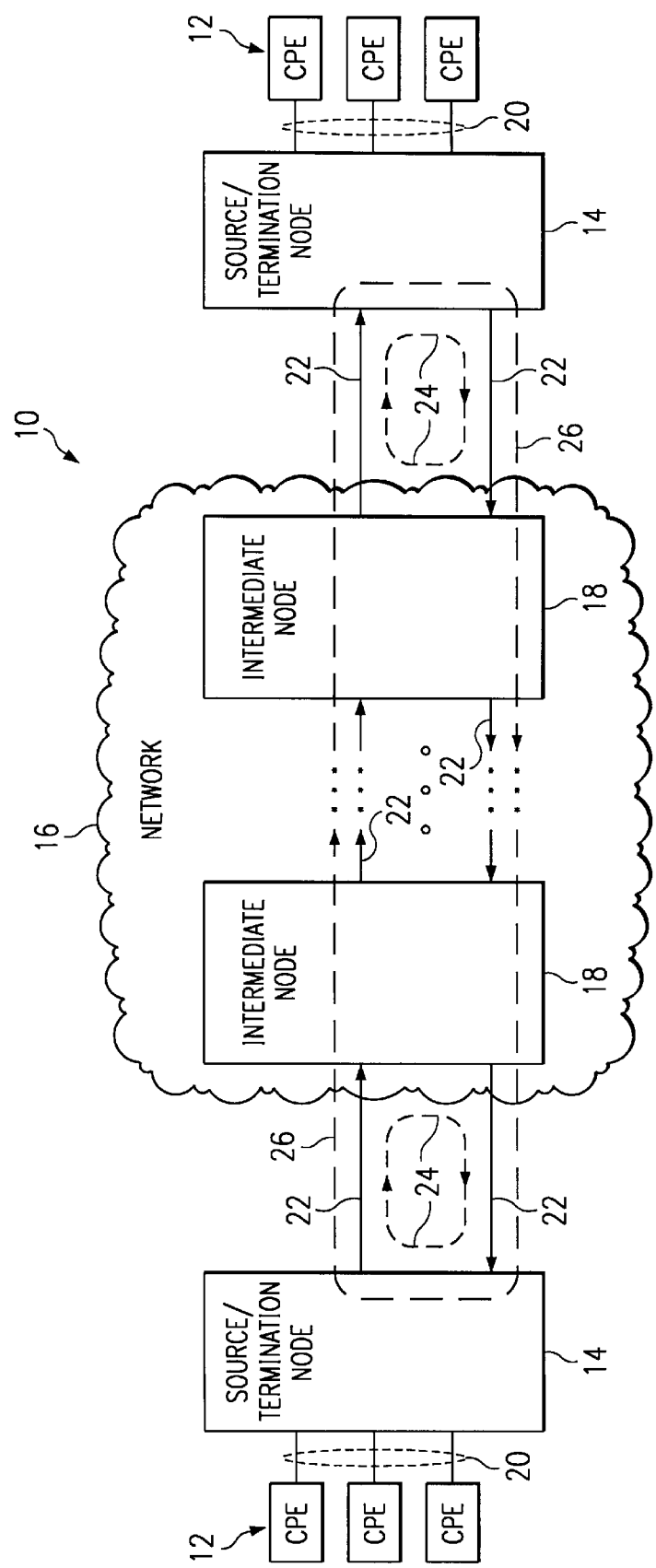
FIG. 1 is a block diagram illustrating a telecommunications system in accordance with one embodiment of the present invention.

FIG. 1 illustrates a telecommunications system 10 in accordance with one embodiment of present invention. The telecommunications system 10 transmits voice, data, video, other suitable types of information, and/or a combination of different types of information between source and destination points.

Referring to FIG. 1, the telecommunications system 10 includes customer premise equipment (CPE) 12 and integrated access devices (IADs) 14 connecting the customer premise equipment 12 to a network 16. The network 16 may include portions of the Internet, one or more intranets or other wide or local area networks and the like. In a particular embodiment, the network 16 includes backbone routers 18 at its borders for communicating with the integrated access devices 14. In this embodiment, the integrated access devices 14 may be Cisco 6732 integrated access devices and the backbone routers may be Cisco 12000 routers. It will be understood that different types of integrated access devices and backbone routers as well as different types of devices capable of directing, switching or otherwise routing traffic may be used in connection with the present invention.

The customer premise equipment 12 includes standard telephones, modems, computers, data phones and other devices capable of generating traffic for transmission in the telecommunication system 10. The customer premise equipment 12 is connected to the integrated access devices 14 through a communication link 20. The communication link 20 may be a T1 line, conventional twisted pair cable or the suitable type of wire line or wireless link.

The integrated access devices 14 communicate voice, data, and/or video traffic between the customer premise equipment 12 and the network 16. Ingress traffic from the customer premise equipment 12 is segmented into the asynchronous transport mode (ATM) or other suitable format by the integrated access devices 14 for high-speed transmission to and within the network 16. Ingress traffic from the network 16 is reassembled from the ATM format into its native format for delivery to the customer premise equipment 12.

ATM is a connection-oriented technology in which traffic is organized into small, fixed-length cells. Each cell includes an address tag that defines a connection between source and termination points. For the embodiment of FIG. 1, the integrated access devices 14 are source/termination nodes and the backbone routers 18 are intermediate nodes for a virtual connection 22 spanning across the telecommunications system 10. The ATM cells for each connection are routed through the telecommunications system 10 in a corresponding virtual connection 22.

Each virtual connection 22 is managed through an ATM management layer (M-plane) that comprises a stream of operation, administration, and management (OAM) cells. The OAM cells for a virtual connection 22 are carried within the traffic stream for the virtual connection 22. The OAM cells may be segment OAM cells 24 communicated between adjacent nodes in the virtual connection 22 or end-to-end OAM cells 26 transmitted between source and termination nodes of the virtual connection 22. Together, the segment and end-to-end OAM cells 24 and 26 manage the virtual connection 22. Further information concerning the ATM format, ATM cells, the ATM management layer, and the OAM cells may be obtained from the ATM Forum.

FIG. 2 illustrates a standard ATM cell 50 for transmission within the virtual connection 22 of the telecommunications system 10. The ATM cell 50 includes an ATM cell header 52 followed by an ATM cell payload 54. The ATM cell payload 54 has a forty-eight (48) byte capacity for transporting voice, data, video and other suitable types of information and associated data.

The ATM cell header 52 includes five (5) bytes of addressing and overhead information for routing the ATM cell 50 within the telecommunications system 10. In particular, the ATM cell header 52 includes a virtual path indicator (VPI) 60, a virtual channel indicator (VCI) 62 and a payload type indicator (PTI) 64. The VPI 60 identifies a virtual path connection (VPC) in which the ATM cell 50 is routed. The VCI 62 identifies a virtual channel connection (VCC) in which the ATM cell 50 is routed. Each virtual connection 22 may be either a VPC or a VCC. In addition, VPC's may include a number of VCC being routed with each other. Together, the VPI and VCI 60 and 62 form at least part of an address tag that identifies the next destination of the cell as it passes through a series of ATM switches in the telecommunications system 10 on the way to its destination.

For a VPC, the VCI 62 is used to indicate an OAM cell: a VCI value of 3 (binary 011) indicates a segment OAM cell 24 and a VCI value of 4 (binary 100) indicates an end-to-end OAM cell 26. For a VCC, the PTI 64 is used to indicate an OAM cell with a PTI value of 4 (binary 100) indicating a segment OAM cell and a PTI value of 5 (binary 101) indicating an end-to-end OAM cell. Further information regarding the ATM cell header 52, VPI 60, VCI 62, PTI 64 and identification of OAM cells may be obtained from the ATM Forum.

Figure 3:
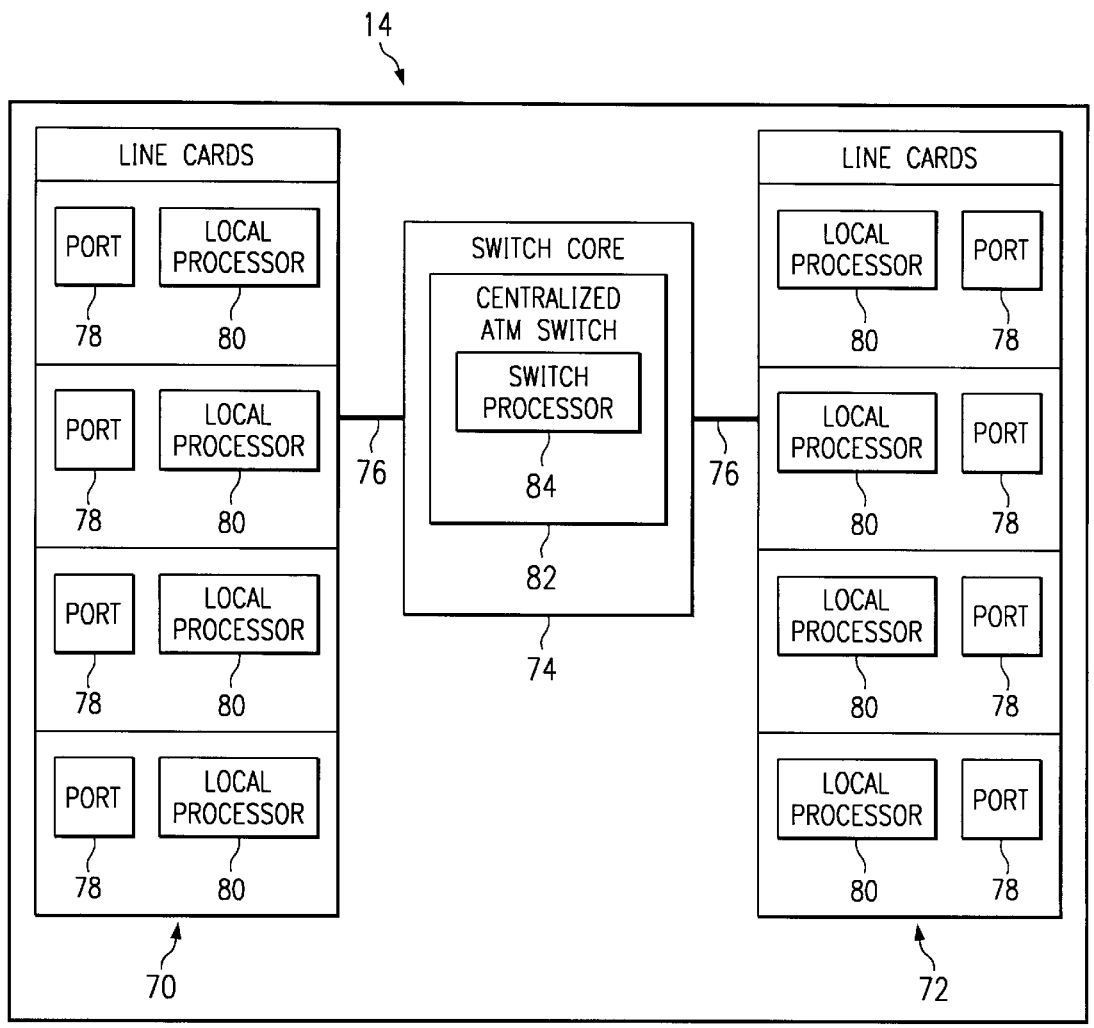
FIG. 3 is a block diagram illustrating details of a node in the telecommunication system of FIG. 1 in accordance with one embodiment of the present invention.

FIG. 3 illustrates details of the integrated access devices 14 in accordance with one embodiment of the present invention. In this embodiment, the integrated access devices 14 are each implemented in a card shelf configuration with functionality of the device distributed between discrete cards connected by a bus. The bus may include one or more parallel or serial links between cards. It will be understood that other types of access devices and/or nodes may be used in connection with the present invention.

Referring to FIG. 3, the integrated access device 14 includes a set of customer line cards 70, a set of network line cards 72, a switch core 74 and a backplane 76. Each customer and network line card 70 and 72 is a discrete card configured to plug into the backplane 76. As used herein, each means every one of at least a subset of the identified items. The switch core 74 may comprise one or more discrete cards also configured to plug into the backplane 76. The backplane 76 includes a bus communicating service traffic, control data, and other information between the line card 70 and 72 and the switch core 74.

The line cards 70 and 72 each include one or more ports 78 and a traffic processor 80. The ports 78 receive ingress traffic from an external link and/or transmit egress traffic routed to the line card 70 or 72 by the switch core 74. The traffic processor 80 is preferably local to the line card 70 or 72 and includes hardware and/or software loaded on a computer-readable medium for processing ATM and other traffic. For ATM traffic, the traffic, or local, processor 80 of each network line card 72 adds a supplemental header to each ATM cell 50 received from an external link. The supplemental header may be an intranode header that provides additional information about the ATM cell 50 to components within the integrated access device 14. In a particular embodiment, the local processor 80 initially includes a loop-back tag in the supplemental header. The loop-back tag indicates to the switch core 74 that the ATM cell 50 is to be returned to the line card 72 for processing if the ATM cell 50 is an OAM cell.

In processing OAM cells identified by and returned from the switch core 74, the local processor 80 determines whether each OAM cell is destined for the integrated access device 14 or for a downstream device. In one embodiment, the local processor 80 implements a standard based OAM stack process. An OAM cell is destined for the local integrated access device 14 if the OAM cell is either a segment OAM cell 24 or an end-to-end OAM cell 26 for a virtual connection 22 in which the integrated access device 14 is the termination node. In either case, OAM cells destined for the integrated access device 14 are further processed by the local processor 80 in accordance with ATM standards. OAM cells destined for remote nodes are passed to and routed by the switch core 74.

In a particular embodiment, the local processor 80 includes a pass-through tag in the supplemental header of OAM cells destined for a remote node. Such OAM cells are then forwarded back to the switch core 74 for routing to their remote destination. The OAM cells are each routed to their remote destinations based on address tags in the cell. It will be understood that the status of an OAM cell may be otherwise suitably communicated between the line cards 72 and the switch core 74.

The switch core 74 includes a centralized ATM switch 82 having a switch processor 84. The centralized ATM switch 82 routes traffic for a plurality of the customer and/or network line cards 70 and/or 72. Accordingly, the switch core 74 may include one or more centralized ATM switches 82.

The switch processor 84 includes hardware and/or software loaded on a computer-readable medium for performing header look-up and recognition at line rates on ATM cells in an incoming traffic stream in accordance with conventional ATM switching techniques. In performing header look-up and recognition, the switch processor 84 identifies OAM cells within the traffic stream. The switch processor 84 returns the OAM cells having the loop-back tag to the receiving line card 72 for processing. In a particular embodiment, the switch processor 84 includes an OAM cell indicator in the supplemental header of OAM cells to be returned to the line card 72 to allow the line card 72 to recognize the cell as an OAM cell to be processing by the line card 72. It will be understood that the identification of an OAM cell may be otherwise suitably communicated between the switch core 74 and the line cards 72.

The switch processor 80 routes OAM cells having a pass-through tag based on their address tag. The pass-through tag indicates that the OAM cell has been previously returned to a line card 72, processed by the line card 72 and returned back to the switch processor 84 for routing to a remote destination, In one embodiment, OAM and other ATM cells are routed to an output port 78 by the centralized ATM switch 82 by placing each cell in a queue associated with the appropriate output port. In this embodiment, multicast cells to be transmitted to plurality of destinations are separately routed to the output ports associated with each destination for transmission to those destinations by being separately placed in the queues for each output port.

The distributed processing of OAM cells between the centralized ATM switch 82 and a line card 72 alleviates the overall processing load on the switch processor 84 and allows other value-added processing to be performed by the switch processor 84 on a traffic stream. In addition, the distributed processing provides a more scalable architecture for a telecommunications device by taking advantage of parallel processing power of multiple processors spread across multiple elements. As a result, system cost is more directly proportional to functionality. This allows low-cost solutions for low-rate and other limited applications.

For ATM traffic, OAM cells are recognized by a centralized ATM switch 82 and looped-back to the receiving line card 72 for processing. As a result, processing of the OAM cells is off-loaded to the line cards 72 while header recognition and look-up on an incoming ATM stream is conventionally performed by the centralized ATM switch 82 in connection with its normal switching activities. Thus, costs and board space on the line cards with OAM processing functionality are reduced. In addition, the scalable management layer (M-plane) architecture insures that ATM switching capacity of the node is limited only by the switch-bandwidth, not processing power. It will be understood that other types of tag-switched and other suitable traffic may be similarly looped back with a suitable identification and status indicators as described in connection with OAM traffic for an ATM traffic stream. It will be further understood that processing of OAM and other suitable traffic may be otherwise suitably distributed between elements within the integrated access device 14 or other telecommunication node.

FIG. 4 illustrates details of a supplemental header 100 for an ATM cell 50 in accordance with the one embodiment of the present invention. The supplemental header 100 is used for internode communication of information about the ATM cell 50. In the illustrated embodiment, the supplemental header 100 entirely proceeds the ATM cell 50. It will be understood that the supplemental header 100 may also comprise a portion trailing the ATM cell 50.

Referring to FIG. 4, the supplemental header 100 includes an OAM processing field 102. The OAM processing field 102 is initially used by line card 72 to include a loop-back tag with the ATM cell 50 when forwarding the cell 50 to the switch core 74 for processing. The switch core 74, in response to determining if the cell 50 is an OAM cell, includes an OAM cell tag in the OAM processing field 102 and then returns the OAM cell to the line card 72 for processing. The OAM cell tag indicates to the line card 72 that the cell is an OAM cell returned from the switch core 74 for processing by the line card 72. If processing determines the OAM cell is destined for a remote location, the line card 72 includes a pass-through tag in the OAM processing field 102 and then forwards the OAM cell back to the switch core 74. The pass-through tag indicates to the switch core 74 that the OAM cell is to be routed to its remote destination based on its address tag. In this way, a single field 102 is used to communicate the identification and status, including action to be taken, for OAM cells between the line cards 72 and the switch core 74. It will be understood that the identification and status of an OAM cell may be otherwise suitably indicated in or outside of the supplemental header 100.

In a particular embodiment, the OAM processing field 102 is set to one (1) for all incoming traffic by the line cards 72. This indicates to the switch core 74 that the cells identified as OAM cells are to be returned to the line cards 72. In this embodiment, each such OAM cell is returned to the receiving line card 72 with the OAM processing field 102 still set to one (1). This indicates to the line card 72 that the cell received from the switch core 74 is an OAM cell for processing. OAM cells determined to be destined for a remote location are returned back to the switch core 74 with the OAM processing field 102 set to zero (0). This indicates to the switch core 74 that the cell, even if it is an OAM cell, is to be routed based on its address tag. In this way, a one (1) bit field is used to communicate the identification and status of OAM cells within the integrated access device 14.

Figure 5:
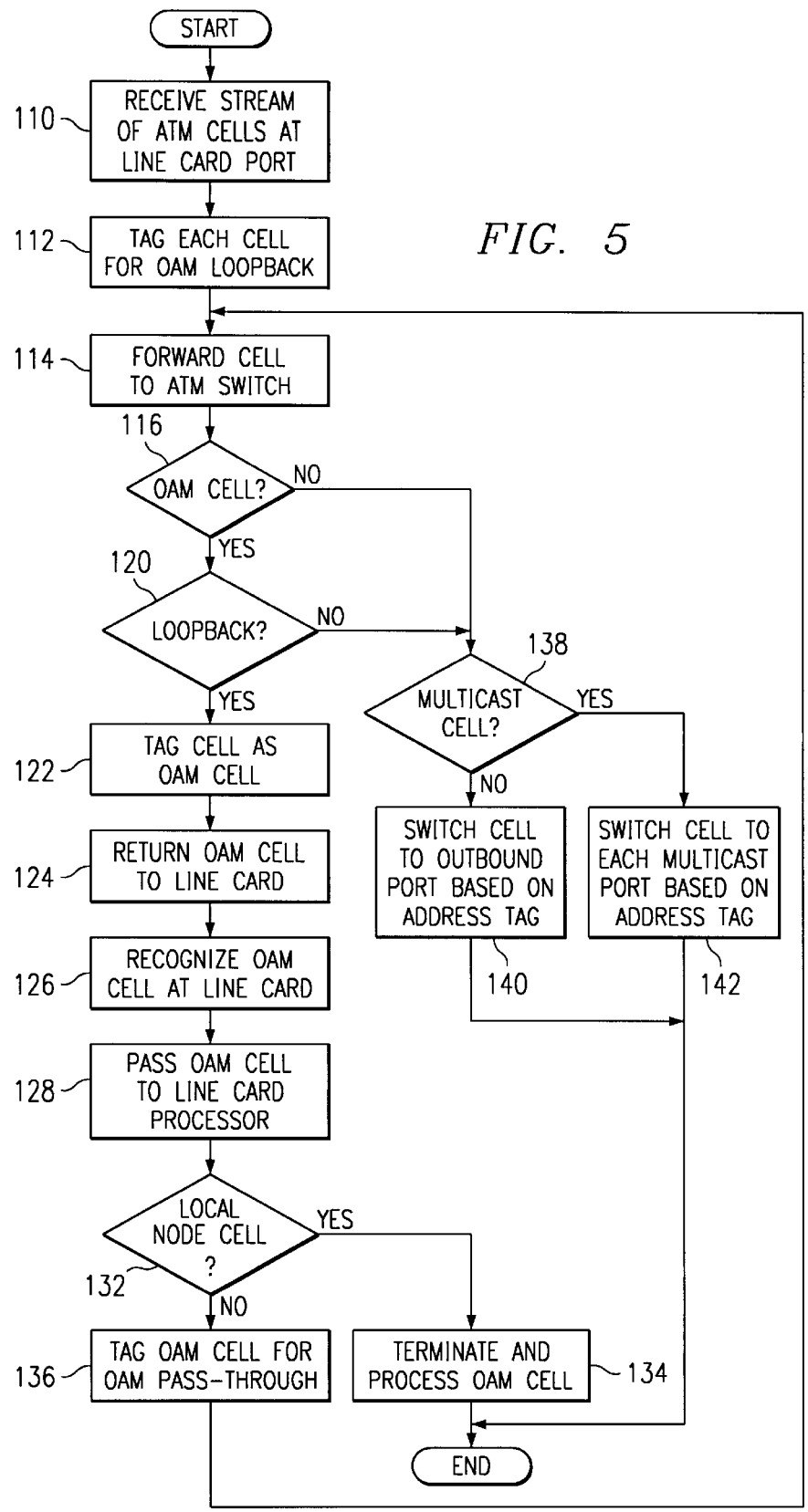
FIG. 5 is a flow diagram illustrating distributed processing of ATM operation, management, and administration (OAM) cells in the node of FIG. 3 in accordance with one embodiment of the present insertion.

FIG. 5 is flow diagram illustrating a method for distributed processing of OAM traffic in accordance with one embodiment of the present invention. It will be understood that processing of OAM traffic may be otherwise suitably distributed within a telecommunications node and that other suitable types of management and other traffic of a particular type identifiable by a centralized switch or other suitable element may be likewise distributed within the node in accordance with the present invention.

Referring to FIG. 5, the method begins at step 110 in which a stream of ATM cells 50 is received at a port 78 of a network line card 72. Next, at step 112, the line card 72 tags each cell 50 for OAM loop-back. In one embodiment, the line card 72 adds the supplemental header 100 to each ATM cell 50 and includes a loop-back tag in the OAM processing field 102 of the supplemental header 100 to indicate that the cell 50 should be looped back to the line card 72 for processing if the cell 50 is an OAM cell.

Proceeding to step 114, the line card 72 forwards the ATM cell 50 to the centralized ATM switch 82 for processing by the switch processor 84. At decisional step 116, the switch processor 84 determines whether the ATM cell 50 is an OAM cell based on conventional header look up and recognition processes performed in accordance with conventional switching operations. If the cell 50 is an OAM cell, the Yes branch of decisional step 116 leads to decisional step 120.

At decisional step 120, the switch processor 84 determines whether the OAM cell is to be looped-back to the line card 72 for processing. In one embodiment, this is determined based on the existence of a loop-back tag in the OAM processing field 102. If the OAM cell is to be looped-back, the Yes branch of decisional 120 leads to step 122 in which the switch processor 84 tags the cell as an OAM cell for recognition by the line card 72. In one embodiment, the switch processor 84 tags the OAM cell as such by including an OAM cell tag in the OAM processing field 102 of the supplemental header.

Proceeding to step 124, the centralized ATM switch 82 returns the identified and tagged OAM cell to the line card 72 for processing. At the line card 72, the OAM cell is recognized as such based on the OAM cell tag or other suitable identification provided by the centralized ATM switch 82. At step 128, the line card 72 passes the OAM cell to the local processor 80 for local processing. The local processor 80 implements a standards-based OAM stack or other suitable process.

Next, at decisional step 132, the local processor 80 determines whether the OAM cell is destined for the local telecommunications node. In one embodiment, the OAM cell is destined for the local node if it is a segment OAM cell from another node in the virtual connection 22 or it is an end-to-end OAM cell and the local node is the termination node for the virtual connection 22. In this embodiment, end-to-end OAM segments received at an intermediate node 18 are destined for a remote termination node 14. If the OAM cell is destined for the local telecommunications nodes, the Yes branch of decisional step 132 leads to step 134 in which the OAM cell is terminated and further processed at the line card 72. If the OAM cell is not destined for the local node, the No branch of decisional step 132 leads to step 136 in which the OAM cell is tagged for pass-through by the centralized ATM switch 82. Step 136 returns to step 114 in which the cell is forwarded back to the centralized ATM switch 82 for routing.

Returning to decisional step 116, if the cell 50 at the centralized ATM switch 84 is not an OAM cell, the No branch of decisional step 116 leads to decisional step 138. Similarly, at decisional step 120, if the cell is an OAM cell with a pass-through tag, the No branch of decisional step 120 leads to decisional step 138. At decisional step 138, the switch processor 84 determines whether the non OAM cell or pass-through OAM cell is a multi-cast cell. If the cell 50 is not a multi-cast cell, the cell is routed to an outbound port based on an included address tag. As previously described, the address tag may include the VPI 60 and VCI 62. If the cell 50 is a multi-cast cell, the Yes branch of decisional step 138 leads to step 142 in which the cell is switched to an outlet port for each destination based on the address tag. This may be accomplished by including copy of the cell 50 in the queue for each appropriate outbound port. Steps 140 and 142 both lead to the end of the process by which OAM processing is distributed between the line cards 72 and the centralized ATM switch 82. It will be understood that the method and system of the present invention may be used in connection with other types of suitable traffic in need of specialized processing in a telecommunications node.

Although the present invention has been described with several embodiments, various changes and modifications may be suggested to one skilled in the art. It is intended that the present invention encompass such changes and modifications as fall within the scope of the appended claims.

What is claimed is:

1. A method for distributed processing of traffic in a telecommunications node, comprising;

receiving a traffic stream at a line card of a telecommunications node, the traffic stream including a plurality of discrete cells of a plurality of types;

forwarding the cells from the line card to a centralized switch of the telecommunications node for identification at the centralized switch cells of a particular type having a loop-back tag, the loop-back tag indicating that the cells should be returned to the line card if the centralized switch identifies the cell as being of the particular type such that processing of cells of the particular type will occur at the line card rather than at the centralized switch;

identifying cells of the particular type having the loop-back tag at the centralized switch;

returning cells identified at the centralized switch as being of the particular type having the loop-back tag from the centralized switch to the line card for processing at the line card rather than at the switch; and processing at the line card the cells of the particular type having the loop-back tag returned from the centralized switch.

2. The method of claim 1, wherein the discrete cells comprise asynchronous transfer mode (ATM) cells and the cells of the particular type comprises operation, administration, and management (OAM) cells with a loop-back indicator.

3. The method of claim 1, wherein the centralized switch is remote from the line card, further comprising:
   forwarding the cells from the line card to the centralized switch over a backplane of the telecommunications node; and
   returning the cells of the particular type from the centralized switch the line card over the backplane.

4. The method of claim 1, wherein the cells of the particular type comprise control cells having a loop-back tag, further comprising:
   at the line card, adding to each cell received in the traffic stream a supplemental header including a loop-back tag;
   identifying control cells having the loop-back tag at the centralized switch; and
   returning the control cells having the loop-back tag from the centralized switch to the line card.

5. The method of claim 4, further comprising:
   at the centralized switch, including a control cell tag in the supplemental header of control cells identified as having the loop-back tag; and
   processing control cells having the control cell tag at the line card.

6. The method of claim 5, processing the control cells having the control cell tag at the line card further comprising:
   determining whether the control cells are destined for the telecommunications node;
   including a pass-through tag in the supplemental header of control cells not destined for the telecommunications node;
   forwarding the control cells having the pass-through tag from the line card back to the centralized switch; and
   routing each control cell having the pass-through tag at the centralized switch based on an address tag in the control cell.

7. The method of claim 6, further comprising:
   determining at the centralized switch whether each control cell having the pass-through tag is a multi-cast cell destined for a plurality of destinations; and
   separately transmitting each multi-cast cell toward each destination.

8. The method of claim 1, wherein the cells of the particular type comprise control cells having a loop-back indicator, further comprising:
   determining at the centralized switch whether each control cell comprises a loop-back indicator for return to the line card; and
   returning the control cells having the loop-back indicator to the line card for processing.

9. The method of claim 8, further comprising routing at the centralized switch each control cell not comprising a loop-back indicator based on an address tag in the control cell.

10. A method for processing asynchronous transfer mode (ATM) operation, administration, and management (OAM) traffic in a telecommunications node, comprising:
    receiving an ATM traffic stream at a line card of a telecommunications node, the ATM traffic stream including a plurality of discrete ATM cells, a portion of the ATM cells comprising OAM cells;
    at the line card, adding to each ATM cell received in the traffic stream a supplemental header including a loop-back tag;
    forwarding the ATM cells from the line card to a centralized ATM switch for the telecommunications node for identification at the centralized ATM switch OAM cells having the loop-back tag, the loop-back tag indicating that the ATM cells should be returned to the line card if the centralized ATM switch identifies the ATM cell as being an OAM cell such that processing of OAM cells will occur at the line card rather than at the centralized ATM switch;
    identifying OAM cells having the loop-back tag at the centralized ATM switch;
    at the centralized ATM switch, including an OAM tag in the supplemental header of cells determined by the centralized ATM switch to be OAM cells having the loop-back tag;
    returning OAM cells having the OAM tag included at the centralized ATM switch from the centralized ATM switch to the line card fo processing at the line card rather than at the centralized ATM switch; and
    processing at the line card the OAM cells returned from the centralized ATM switch having the OAM tag.

11. The method of claim 10, processing the OAM cells having the OAM tag at the line card further comprising:
    determining whether the OAM cells are destined for the telecommunications node;
    including a pass-through tag in the supplemental header of the OAM cells not destined for the telecommunications node;
    forwarding the OAM cells with the pass-through tag from the line card back to the centralized ATM switch; and
    routing each OAM cell with the pass-through tag at the centralized ATM switch based on an address tag in the OAM cell.

12. The method of claim 11, determining whether the OAM cells are destined for the telecommunications node further comprising:
    determining whether the OAM cells are segment OAM cells; and
    determining whether the OAM cells are end-to-end OAM cells for which the telecommunications node is a termination node.

13. A telecommunications node, comprising:
    a line card operable to:
        receive a traffic stream including a plurality of discrete cells of plurality of types; and
        forward the cells to a centralized switch of the telecommunication node for identifying at the centralized switch cells of a particular type having a loop-back tag;
    the centralized switch, operable to:
        identify cells of the particular type having the loop-back tag; and
        return the cells identified at the centralized switch as being of the particular type having loop-back tag from the centralized switch to the line card for processing at the line card rather than at the centralized switch; and
    the line card operable to process the cells of the particular type having the loop-back tag returned from the centralized switch.

14. The telecommunications node of claim 13, wherein the discrete cells comprise asynchronous transfer mode (ATM) cells and the cells of the particular type comprise operation, administration, and management (OAM) cells with a loop-back indicator.

15. The telecommunications node of claim 13, further comprising:
a switch card including the centralized switch;
a backplane comprising a bus connecting the line card to the switch card;
the line card operable to forward the cells to the switch card over the bus; and
the switch card operable to return the cells of the particular type to the line card over the bus.

16. The telecommunications node of claim 13, wherein the cells of the particular type comprise control cells having a loop-back tag, further comprising:
the line card operable to add to each cell received in the traffic stream a supplemental header including a loop-back tag;
the centralized switch operable to return control cells having the loop-back tag to the line card.

17. The telecommunications node of claim 16, further comprising:
the centralized switch operable to include a control cell tag in the supplemental header of control cells having the loop-back tag; and
the line card operable to process control cells having the control cell tag.

18. The telecommunications node of claim 17, further comprising:
the line card operable to determine whether control cells having the control cell tag are destined for the telecommunications node, to include a pass-through tag in the supplemental header of each control cell not destined for the telecommunications node, and to forward the control cells having the pass-through tag back to the centralized switch; and
the centralized switch operable to route each control cell having the pass-through tag based on an address tag in the control cell.

19. The telecommunications node of claim 18, the centralized switch further operable to determine whether each control cell having the pass-through tag is a multi-cast cell destined for plurality of destinations and to separately transmit each multi-cast cell toward each destination.

20. A line card for a telecommunications node, comprising:
a port operable to receive a traffic stream including a plurality of discrete cells of a plurality of types;
a traffic processor operable to:
forward each cell along with a loop-back tag for the cell to a centralized switch for identifying at the centralized switch cells of a particular type having the loop-back tag, the loop-back tag indicating to the centralized switch that the cell is to be returned to the line card for processing at the line card if it is identified as being of a particular type having the loop-back tag; and
receive cells identified at the centralized switch as being of the particular type having the loop-back tag from the centralized switch for processing at the line card rather than at the centralized switch; and
process the cells of the particular type having the loop-back tag received from the centralized switch.

21. The line card of claim 20, wherein the discrete cells comprise asynchronous transfer mode (ATM cells and the cells of the particular type comprise operation, administration, and management (OAM) cells having a loop-back indicator.

22. The line card of claim 20, wherein cells of the particular type comprise control cells, further comprising the traffic processor operable to recognize control cells returned from the centralize switch based on a control cell tag added to the control cells by the centralized switch.

23. The line card of claim 20, the traffic processor further operable determine whether cells of the particular type returned from the centralized switch are destined for a telecommunications node in which the line card resides, and to forward cells not destined for the telecommunications node back to the centralized switch along with the pass-through tag, the pass-through tag indicating to the centralized switch that the cells are to be routed based on address tags in the cells.

24. A method for processing traffic at a line card of a telecommunications node, comprising:
receiving a traffic stream including a plurality of discrete cells at a line card of a plurality of types;
forwarding each cell to a centralized switch along with a loop-back tag for identifying at the centralized switch cells of a particular type having the loop-back tag, the loop-back tag indicating to the centralized switch that the cell is to be returned to the line card if it is identified by the centralized switch as being of the particular type having the loop-back tag; and
receiving from the centralized switch cells identified at centralized switch as being of the particular type hang the loop-back tag for processing at the line card rather than at the centralized switch; and
processing at the line card cells identified at the centralized switch as being of the particular type having the loop-back tag.

25. The method of claim 24, wherein the discrete cells comprise and synchronous transfer mode on(ATM) cells and the cells of the particular type comprise operation, administration, and management (OAM) cells having a loop-back indicator.

26. The method of claim 24, wherein cells of the particular type comprise control cells having a loop-back indicator, further comprising the line card recognizing control cells returned from the centralized switch based on a control cell tag added to the cells by the centralized switch.

27. The method of claim 24, further comprising:
determining whether the cells of the particular type returned from the centralized switch are destined for a telecommunications node in which the line card resides; and
forwarding the cells of the particular type not destined for the telecommunications node back to the centralized switch along with a pass-through tag indicating to the centralized switch that the cells are to be routed based on address tags in the cells.

28. A signal propagated on a transmission medium, the signal comprising:
an asynchronous transfer mode (ATM) operation, administration, and management (OAM) cell;
a supplemental header added to the ATM OAM cell at a receiving line card of a telecommunications node, to supplemental header encapsulating the ATM OAM cell; and
an OAM field in the supplemental header, the OAM field comprising a loop-back tag indicating to a centralized switch in the telecommunications node receiving the ATM OAM cell from the receiving line card that the ATM OAM cell is to be looped-back from the centralized switch to the receiving line card for processing at the receiving line card rather than at the centralized switch.

29. A signal propagated on a transmission medium, the signal comprising:

an asynchronous transfer mode (ATM) operation, administration, and management (OAM) cell;

a supplemental header added to the ATM OAM cell at a line card of a telecommunications node, the supplemental header encapsulating the ATM OAM cell; and an OAM field in the supplemental header, the OAM field comprising a loon-back tag added by a centralized switch in the telecommunications node, the loop-back tag indicating to the line card in the telecommunications node receiving the ATM OAM cell from the centralized switch that the cell is an ATM OAM cell being looped-back by the centralized switch to the line card for processing at the line card rather than at the centralized switch.

30. A signal propagated on a transmission medium, the signal comprising:

an asynchronous transfer mode (ATM operation, administration, and management (OAM) cell;

a supplemental header added to the ATM OAM cell at a line of a telecommunications node, the supplemental header capsulating the ATM OAM cell; and an OAM field in the supplemental header, the OAM field comprising a tag indicating to a centralized switch in the telecommunications node receiving the ATM OAM cell from the line card that the ATM OAM cell is to be passed-through the centralized switch rather than looped-back to the line card for processing.

31. A method for distributed processing of traffic in a telecommunications node, comprising:

receiving a traffic stream at a line card of a telecommunications node, the traffic stream including a plurality of discrete cells of a plurality of types;

at the line card, adding to each cell received in the traffic stream a supplemental header including a loop-back tag;

forwarding the cells from the line card to a centralized switch of the telecommunications node for identifying at the centralized switch control cells having the loop-back tag, the loop-back tag indicating that the cells should be returned to the line card if the centralized switch identifies the cell as being of the particular type such that processing of cells of the particular type will occur at the line card rather than at the centralized switch;

identifying control cells having the loop-back tag at the centralized switch;

returning control cells identified at the centralized switch as having the loop-back tag from the centralized switch to the line card for processing at the line card rather than at the centralized switch; and processing at the line card the control cells having the loop-back tag returned from the centralized switch.

* * * * *

UNITED STATES PATENT AND TRADEMARK OFFICE
CERTIFICATE OF CORRECTION

PATENT NO. : 6,724,728 B1
DATED : April 20, 2004
INVENTOR(S) : Manchester et al.

It is certified that error appears in the above-identified patent and that said Letters Patent is hereby corrected as shown below:

Title page,
Item [75], Inventors, delete "Rohnert Park" and insert -- Cotati --; and delete "Tom" and insert -- Thomas A. --.

Column 10,
Line 24, after first "card", delete "fo", and insert -- for --.

Column 12,
Line 2, after "(ATM" insert -- ) --.
Line 63, after "node", delete "to", and insert -- the --.

Column 13,
Line 16, after first "a", delete "loon-back", and nsert -- loop-back --.
Line 26, after "(ATM" insert -- ) --.
Line 29, after "line", insert -- card --.
Line 30, after "header", delete "capsulating", and insert -- encapsulating --.

Signed and Sealed this

Thirty-first Day of August, 2004

JON W. DUDAS
*Director of the United States Patent and Trademark Office*